Nov. 21, 1967   E. L. WILLIAMS   3,354,052
APPARATUS FOR DISTILLING AND CONTROLLING PROPORTION
OF COMPONENTS OF A MIXTURE
Filed May 18, 1964                              2 Sheets-Sheet 2

United States Patent Office 3,354,052
Patented Nov. 21, 1967

3,354,052
APPARATUS FOR DISTILLING AND CONTROL-
LING PROPORTION OF COMPONENTS OF A
MIXTURE
Edward L. Williams, Tulsa, Okla., assignor to Texaco Inc.,
New York, N.Y., a corporation of Delaware
Filed May 18, 1964, Ser. No. 368,250
6 Claims. (Cl. 202—160)

This invention relates to a method and apparatus for determining and controlling a fluid composition. More particularly, it relates to a method of determining and controlling a fluid composition by comparison of the flash vaporization temperature of the composition with the flash vaporization temperature of a standard composition.

Mixture of fluids may be separated into constituent fractions by numerous means including, for example, distillation, solvent extraction, absorption, and adsorption. In such separation processes, it is desirable to effect control of the operation by the primary variable of product composition rather than by secondary variables such as temperature, flow rates and other factors affecting separation efficiency. Primary control by product composition, however, is difficult and expensive because of the complex nature of analytical equipment capable of analyzing and determining the composition of mixtures. In accordance with this invention a simple means is provided of determining the composition of a product of a separation process by comparison of the separated product with a standard composition having the desired composition. An object of this invention is to provide a means of determining the composition of a product of a separation process as it is made against a reference product which meets required specifications. Another object of this invention is to provide a means of controlling a separation process so that the product of the desired specifications is continuously produced. These and other objects are obtained by continuously comparing the temperature of the product and of a reference product when adiabatically expanded under identical conditions.

The comparison is accomplished by expanding the product fluid, which may be a liquid or a gas, and the reference fluid at the same temperature and pressure into separate zones of lower but equal pressure. The lower pressure permits expansion of vapor fractions and vaporization of liquid fractions with concomitant cooling. In an adiabatic expansion into a zone of lower pressure, the resulting temperature is a function of the initial and final conditions and the composition of the expanded fluid. By effecting expansion of a composition and a standard composition through orifices under identical conditions, any difference in resulting temperature may be related to differences in the composition.

In accordance with the process of this invention a constituent of a fluid mixture is measured by adiabatically expanding said fluid mixture from an initial temperature $T_1$ and an initial pressure $P_1$ into a zone at a lower pressure $P_2$ effecting cooling of the expanded mixture to a resulting temperature $T_2$. A standard fluid mixture containing the same constituents in known concentration is also adiabatically expanded from the same initial temperature $T_1$ and initial pressure $P_1$ into a zone at the same lower pressure $P_2$ resulting in cooling the expanded mixture to a temperature $T'_2$. Temperatures $T_2$ and $T'_2$ are then compared manually or by automatic means such as differential temperature measuring devices. In fluid mixtures containing two constituents, the composition of the unknown mixture and the same mixture are identical when $T_2$ is the same as $T'_2$. In the case of liquid hydrocarbon mixtures, when $T_2$ is higher than $T'_2$, the proportion of lower boiling component in the product under test is less than in the standard mixture.

In a process wherein a product mixture is produced and the concentration of a constituent of the product is dependent upon a controllable process condition, the difference in temperature between $T_2$ and $T'_2$ may be employed to change said process condition such that the concentration of the said constituent in the product is the same as in a standard mixture. In a distillation system, for example, this differential temperature may be employed to control heat input to the system or reflux rate.

Adiabatic expansion may be effected by passing the fluid mixture to be analyzed and the reference fluid mixture through orifices. The temperature of the expanded fluids may be determined by temperature sensing devices, for example, thermistors, thermocouples, thermometers, or thermopiles. The use of thermistors is preferred since these devices are stable, compact, rugged and versatile and permit the measurement of temperatures and differential temperatures with great precision and sensitivity. Thermistors are resistive circuit components having high coefficients of resistance with changing temperature. The coefficient of resistance may be either negative or positive. A typical thermistor comprises a mixture of oxides of manganese and nickel and has a temperature coefficient of resistance of $-4.4$ percent per °C. at 25° C. A temperature sensitivity of 0.0005° C. is readily attained.

Advantageously a thermistor is placed in the expanded vapor stream of the product and another thermistor is placed in the expanded vapor stream of the reference product so as to accurately sense the changes of temperature which occur in the vapor streams. The thermistors may be wired in a Wheatstone bridge which enables a determination of resistance changes occurring in the thermistors. These resistance changes are proportional to temperature changes and any temperature change is related to a change in the composition of the product. The detector system may be calibrated by providing a means to supply the reference product to both expansion orifices whereby the current through both legs of the Wheatstone bridge may be balanced. Unbalance in the Wheatstone bridge circuit thereafter indicates a difference in composition between the product and the reference mixture.

The use of a reference product and the thermal effects attendant with vaporization and expansion to continuously monitor the composition changes ni a fractionated product provides a means to operate a number of fractioning towers in series or in association without manual supervision. This invention is applicable to the determination of the compostion of fluid mixtures containing at least two constituents. The fluid mixture may be either liquid or vapor. The fluid mixture and the reference product, of course, must be in the same state, that is both either liquid or vapor. Preferably fluids in the liquid state are employed since the temperature effect of changing composition is greater and more consistent and reliable process control is obtained. The mixture comprises at least two constituents one of which comprises a lower boiling and the other a higher boiling constituent. Each of these constituents may comprise one or more molecular species, for example, a commercial propane product may comprise about 3 percent ethane, 95 percent propane and 1.5 percent isobutane and .50 percent normal butane. Such a fraction may be considered as a lower boiling constituent of 3 percent ethane and a higher boiling constituent of 97 percent propane and heavier. On the other hand, if butane is the fraction subject to variation in concentration, this fraction may be considered as a mixture comprising 98 percent propane and lighter as the light constituent and 2 percent butanes as the heavy constituent.

The accompanying drawings diagrammatically illustrate the method and apparatus of this invention. Although the drawings illustrate arrangements of apparatus in which the method of the invention may be practiced it is not intended to limit the invention to the particular apparatus or materials described.

FIGURE 2 illustrates the application of the invention to the control of a fractionation system.

FIGURE 3 illustrates a pressure equalizing valve assembly which may be usde in the process of this invention.

Figure 1:
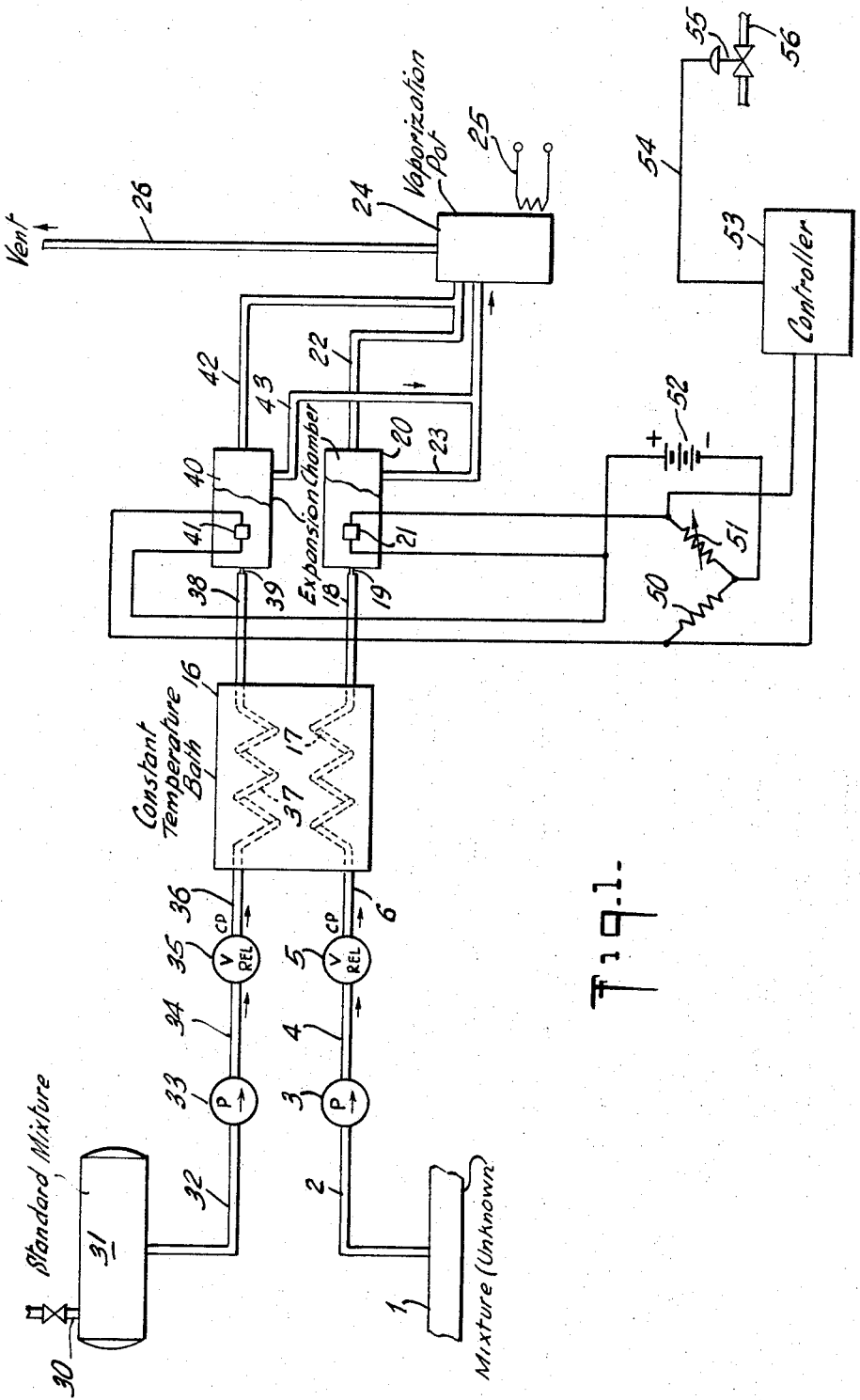
FIGURE 1 illustrates an arrangement of apparatus for comparing the flash vaporization temperature of a product stream with a standard mixture.

Referring to FIGURE 1, a sample of a product stream flowing in line 1 is withdrawn through line 2 and transmitted by pump 3 through line 4 to pressure control valve 5. The product fluid sample at control pressure is passed through line 6 and coil 17 immersed in constant temperature bath 16. Fluid mixture at control pressure and temperature is passed through line 18 and orifice 19 into flash chamber 20. Flash chamber 20 is maintained at about atmospheric pressure. Upon passing through orifice 19, the sample mixture is adiabatically expanded and the temperature drops. The temperature of the resulting vapor-liquid mixture is sensed by thermistor 21 disposed in the flowing stream. Vapors from chamber 20 are discharged through line 22 and liquid through line 23 into vaporization pot 24. Vaporization pot 24 is provided with electrical winding 25 to evaporate any liquid collected therein. Vapors from pot 24 are discharged through vent line 26 to the atmosphere or to a vapor recovery system.

A standard mixture of the same constituents as the product flowing in line 1 but having a known concentration is introduced into drum 31 through filling connection 30. The standard mixture is passed through line 32 by pump 33 and line 34 to pressure control valve 35. Pressure control valve 35 is maintained at the same discharge pressure as control valve 5 by an assembly such as that shown in FIGURE 3. Standard mixture in line 36 is passed through constant temperature coil 37 in constant temperature bath 16 and is discharged through line 38 at the same temperature and pressure as the product stream in line 18. The standard sample in line 38 is passed through orifice 39 into flash chamber 40. Flash chamber 40 is maintained at the same pressure as flash chamber 20 by direct fluid communication of line 42 with line 22 and line 43 in line 23. The resulting temperature of the adiabatic expansion is sensed by thermistor 41.

Thermistors 21 and 41 comprise two arms of a Wheatstone bridge, the other arms being a fixed resistance 50 and a variable resistance 51. A direct current potential is impressed by battery 52 across the Wheatstone bridge and any imbalance is detected by controller 53. In response to measured imbalance, controller 53 transmits a signal, for example a pneumatic signal, through line 54 to control valve 55. Control valve 55 regulates a separation process variable, for example, steam passed through line 56 to supply reboiler heat to a separation process.

FIGURE 2 illustrates a method of controlling the ethane content of propane produced in a natural gasoline plant. Condensate comprising ethane, propane, butane and highboiling hydrocarbons is passed through line 75 to deethanizer 76. Deethanizer 76 is a fractionation tower supplied with reboiler heat by circulating liquid through lines 78 and 79 reboiler 80 and return line 81. The amount of ethane contained in the deethanizer bottoms is controlled by the heat input to the deethanizer. Ethane containing gas is discharged from the top of deethanizer 76 through line 77 to gas recovery facilities. Deethanizer bottoms product in line 78 is passed to depropanizer tower 85.

In tower 85, propane and any remaining ethane are separated as distillate through line 86 and bottoms product through line 87. Reboiler heat is supplied to de-propanizer 85 by circulating bottoms through lines 87 and 88 to reboiler 89 and return line 90. Stripping of the propane and lighter is maintained at a constant rate by supply of steam through line 91 and control valve 92. Distillate withdrawn through line 86 is condensed in cooler 95 and passed through line 96 to reflux and product drum 97. Propane product in line 98 is discharged through line 99 at a rate controlled by valve 100 to maintain the control pressure on the system. Propane product is discharged through line 101. A portion of the propane stream in line 98 is passed by pump 105 through line 106 and control valve 107 and line 108 to depropanizer 85 as reflux.

A portion of the liquid in line 106 is withdrawn through line 4 and passed to adiabatic expansion apparatus 57 such as that illustrated in FIGURE 1 for the determination of flash vaporization temperature. A standard mixture in drum 31 is passed through line 32 by means of pump 33 and lines 34 to adiabatic expansion apparatus 57. Adiabatic expansion apparatus 57 produces a control signal 54 impressed on control valve 55 which controls steam admitted to reboiler 80 through line 56. When a temperature differential determined by adiabatic expansion apparatus 57 indicates that the propane product from line 4 contains ethane in excess of that in standard sample 31 the steam to reboiler 80 is increased thereby stripping additional ethane out of the bottoms of deethanizer 76 until the ethane content of the propane product is reduced to the same value as the standard sample. In the event that the ethane content of the propane falls below that of standard sample 31 indicating excessive deethanization in tower 76 with accompanying loss of propane, control signal 54 reduces the steam to reboiler 80 thereby reducing the boilup in tower 76.

Referring to FIGURE 3 which illustrates a pressure equalization valve assembly, fluid is introduced through line 4 into the inlet chamber formed by the body of valve 5 and wall 127, passes through the port in wall 127 around plug 126 and out line 6. Similarly, fluid in line 34 flows through the inlet of valve 35, the port in wall 130 around plug 131 and out line 36. Plugs 126 and 131 are connected by rods 128 and 132 respectively to diaphragm 133. Line 129 connects line 6 to the chamber formed by diaphragm 133 and diaphragm cover 136 and line 135 connects line 36 to the chamber formed by diaphragm 133 and diaphragm cover 137. In this manner, the pressures in lines 6 and 36 are equalized since any difference in pressure causes the valve supplying the higher pressure to close and the other to open until equalization is again obtained.

*Example I*

A commercial grade of propane with 2.0 percent ethane, 96.0 percent propane and 2.0 percent butane is used as a reference product to control the operation of a deethanizer reboiler and thus control the percentage of ethane in the propane product. The reference product and a sample of propane reflux circulated to the depropanizing tower are continuously passed to an adiabatic expansion apparatus. The control output from a thermistor detector system is used to control the heat to the deethanizer reboiler increasing the heat when the ethane content of the product exceeds that of the reference product and reducing the heat to the deethanizer when the ethane content of the product falls below the reference product. Standard reference sample of propane product and production propane are passed through control valves set to maintain output pressures of 260 pounds per square inch absolute. The two streams are passed through a constant temperature bath at 90° F. Each stream is also passed through an adsorbent bed to remove water vapor. The streams are then passed through orifices into flash chambers vented into a common vent system. When the propane product contains 2 percent ethane, the temperatures of the flashed propane product and the flashed reference sample are the same. When the ethane content of the product propane increases to a level of 4 percent, a temperature differential of 1.43° F. is detected, the temperature of the flashed product being less than the temperature of the standard. This negative temperature differential is converted to a control signal to increase the heat supplied to the deethanizer reboiler whereby the ethane content in the feed to the depropanizer is reduced. When the ethane content is again lowered to 2.0 percent, the temperature of the flashed product and flashed standard sample are again equal.

*Example II*

In another example, the differential flash vaporization temperature is used to maintain the butane content of a propane stream constant by adjusting the reflux rate in a depropanizer tower. A reference sample containing 2.0 percent butane is employed. When the product propane contains the same amount of butane, the temperature of flashing the standard sample and the product propane is the same. When the butane content of the product propane increases to 4.0 percent, the flash vaporization temperature of the product increases 1.18° F. This positive temperature differential is converted to a control signal increasing the reflux rate to the depropanizer tower thereby reducing the butane content of the distillate. When the butane content reaches the standard level of 2.0, the differential temperature becomes zero and the reflux rate is maintained constant.

I claim:

1. In a processing apparatus for producing a first constituent and at least one other constituent and wherein the concentration of said first constituent in said mixture is dependent upon a controllable process condition, the improvement comprising means for controlling said process to produce a product containing a specific concentration of said first constituent which comprises means for substantially continuously withdrawing at least a sample portion of said fluid mixture means for providing a source of reference fluid mixture consisting of said fluid mixture containing said specific concentration of said first constituent first adiabatic expansion means for receiving said withdrawn sample portion of said fluid mixture and for adiabatically expanding said sample portion of said fluid mixture from an initial temperature $T_1$ and an initial pressure $P_1$ into a first zone at a lower pressure $P_2$, second adiabatic expansion means for receiving said reference fluid mixture and for adiabatically expanding at least a portion of said reference fluid mixture from said initial temperature $T_1$ and said initial pressure $P_1$ into a second zone at said lower pressure $P_2$, means comprising a constant temperature bath having corresponding first and second constant temperature coils for simultaneously passing said sample portion of said fluid mixture and said reference fluid mixture, respectively, through a common temperature environment so that said sample and reference fluid mixtures will be at substantially the same initial temperature when supplied to said first and second adiabatic expansion means, respectively, means for generating a signal which is a measure of the difference in temperature of the expanded fluid mixture in said first zone $T_2$ and the expanded reference fluid mixture in said second zone $T'_2$ and means for employing said signal to change said process condition such that said difference in temperatures $T_2$ and $T'_2$ is brought to zero and said product is produced containing said specific concentration of said first constituent.

2. In a distillation processing apparatus wherein a mixture of at least a lower boiling and a higher boiling constituent is distilled, thereby separating a distillate comprising said lower boiling constituent and said higher boiling constituent and wherein the concentration of at least one of said constituents in said distillate is maintainable at a preselected value by control of a distillation process variable, the improved means for controlling said distillation process variable which comprises, means for substantially continuously withdrawing at least a sample portion of said distillate, means for providing a source of reference fluid mixture consisting of said lower boiling constituent and said higher boiling constituent having said preselected concentration of said higher boiling constituent first adiabatic expansion means for receiving said sample of withdrawn distillate mixture and for adiabatically expanding said sample portion of said distillate at an initial temperature $T_1$ and an initial pressure $P_1$ into a first zone at a lower pressure $P_2$, second adiabiatic expansion means for receiving said reference fluid mixture and for adiabatically expanding at least a portion of said reference mixture at said initial temperature $T_1$ and said initial pressure $P_1$ into a second zone at said lower pressure $P_2$, means comprising a constant temperature bath having corresponding first and second constant temperature coils for simultaneously passing said sample portion of said fluid mixture and said reference fluid mixture, respectively, through a common temperature environment so that said sample and reference fluid mixtures will be at substantially the same initial temperature when supplied to said first and second adiabatic expansion means, respectively means for generating a signal which is a measure of the difference in temperature between said distillate expanded into said first zone $T_2$ and said reference mixture expanded into said second zone $T'_2$, and means for controlling said distillation process variable in response to said signal such that said difference in temperatures $T_2$ and $T'_2$ is brought to zero.

3. The apparatus of claim 2 wherein said distillation process variable is the reflux rate.

4. The apparatus of claim 2 wherein said distillation process variable is the heat input.

5. The apparatus of claim 2 wherein said distillate and said reference mixture are expanded through an orifice.

6. An apparatus for controlling a process producing a fluid mixture having a composition the same as a standard fluid mixture wherein said composition is dependent upon a controllable process condition comprising means to effect adiabatic expansion of said fluid mixture from an initial pressure $P_1$ and initial temperature $T_1$ to a lower pressure $P_2$ and resulting temperature $T_2$, means to generate a first signal which is a measure of said temperature $T_2$, means to effect adiabatic expansion of a standard fluid mixture of known composition from said pressure $P_1$ and said temperature $T_1$ to said pressure $P_2$ and a resulting temperature $T'_2$, means comprising a constant temperature bath having corresponding first and second constant temperature coils for simultaneously passing a stream of said fluid mixture and a stream of said standard fluid mixture, respectively, through a common temperature environment so that said sample and reference fluid mixtures will be at substantially the same initial temperature when they are supplied to said means to effect adiabatic expansion of said fluid mixture and said means to effect adiabatic expansion of said standard mixture, respectively, means to generate a second signal which is a measure of said temperature $T'_2$, and means to compare said first and said second signals generating a third signal which is a measure of any difference between said temperature $T_2$ and said temperature $T'_2$ and means to control said process condition in response to said third signal such that said difference between said temperature $T_2$ and said temperature $T'_2$ is maintained at zero.

References Cited

UNITED STATES PATENTS

| | | | |
|---|---|---|---|
| 2,299,899 | 10/1942 | Houghland | 203—2 |
| 2,472,645 | 6/1949 | Clark | 73—27 |
| 2,633,737 | 4/1953 | Richardson | 23—254 X |
| 2,642,386 | 6/1953 | Piros | 202—206 X |
| 2,881,235 | 4/1959 | Van Pool | 23—230 |
| 2,965,549 | 12/1960 | Hudkins | 203—2 |
| 3,009,864 | 11/1961 | Webb | 203—3 X |
| 3,076,697 | 2/1963 | Miller et al. | 23—254 |
| 3,095,739 | 7/1963 | Doolittle | 73—190 |
| 3,108,929 | 10/1963 | Tolin et al. | 202—206 X |
| 3,247,708 | 4/1966 | Luther | 73—53 |
| 3,259,554 | 7/1966 | Constantikes | 203—2 |
| 3,264,862 | 8/1966 | Felton et al. | 73—25 |

FOREIGN PATENTS 892,531 3/1962 Great Britain.

NORMAN YUDKOFF, *Primary Examiner.*

F. E. DRUMMOND, *Assistant Examiner.*

UNITED STATES PATENT OFFICE
CERTIFICATE OF CORRECTION

Patent No. 3,354,052         November 21, 1967

Edward L. Williams

It is hereby certified that error appears in the above numbered patent requiring correction and that the said Letters Patent should read as corrected below.

Column 1, line 16, for "Mixture" read -- Mixtures --; column 2, line 45, for "ni" read -- in --; column 5, line 32, after "producing" insert -- a fluid mixture comprising --.

Signed and sealed this 14th day of January 1969.

(SEAL)
Attest:

Edward M. Fletcher, Jr.        EDWARD J. BRENNER
Attesting Officer           Commissioner of Patents